United States Patent
Gewirtz et al.

(10) Patent No.: US 7,493,615 B2
(45) Date of Patent: Feb. 17, 2009

(54) APPARATUS AND METHOD FOR SYNCHRONIZING MULTIPLE THREADS IN AN OUT-OF-ORDER MICROPROCESSOR

(75) Inventors: Evan H. Gewirtz, Lexington, MA (US); Todd D. Basso, Arlington, MA (US); Daniel L. Leibholz, Newton, MA (US); Benjamin C. Cordes, Chelmsford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 868 days.

(21) Appl. No.: 10/428,597

(22) Filed: May 1, 2003

(65) Prior Publication Data
US 2004/0230975 A1 Nov. 18, 2004

(51) Int. Cl.
G06F 9/46 (2006.01)
G06F 7/38 (2006.01)
(52) U.S. Cl. .................... 718/100; 712/234
(58) Field of Classification Search ............. 718/100; 709/102; 712/234
See application file for complete search history.

(56) References Cited

U.S. PATENT DOCUMENTS

| | | | | |
|---|---|---|---|---|
| 5,357,617 A * | 10/1994 | Davis et al. | ............... | 712/245 |
| 5,797,004 A * | 8/1998 | Lindholm et al. | ......... | 718/104 |
| 6,718,484 B1 * | 4/2004 | Kodera | .................. | 714/35 |
| 2001/0044892 A1 * | 11/2001 | Yamaura | ............. | 712/234 |
| 2003/0061258 A1 * | 3/2003 | Rodgers et al. | ........... | 709/102 |
| 2004/0210876 A1 * | 10/2004 | Stall et al. | ............... | 717/127 |

\* cited by examiner

*Primary Examiner*—Meng-Ai An
*Assistant Examiner*—Camquy Truong
(74) *Attorney, Agent, or Firm*—Brooks Kushman P.C.

(57) ABSTRACT

The present invention generally relates to synchronization of multiple threads in an out-of-order microprocessor utilizing the insertion of a trap. In one embodiment, while synchronizing multiple running threads, an instruction within a first running thread is identified. Upon identification of this instruction, a trap is inserted into a second running thread. All instructions within the instructional pipeline that are scheduled for execution prior to this trapped instruction must retire before the subsequent execution of the synchronizing instruction. Following the execution of the synchronizing instruction, all instructions within the instruction pipeline slated for execution after the trapped instruction in the remaining threads are flushed and refetched.

7 Claims, 5 Drawing Sheets

APPARATUS AND METHOD FOR SYNCHRONIZING MULTIPLE THREADS IN AN OUT-OF-ORDER MICROPROCESSOR

TECHNICAL FIELD OF THE INVENTION

The present invention generally relates to microprocessor synchronization, and more particularly, to the synchronization of multiple threads in an out-of-order microprocessor.

BACKGROUND

Traditional microprocessors are singles-threaded in nature, thereby executing only one thread of execution at a time. The sequence in which instructions are executed in such conventional microprocessors is dictated by the program that includes the instructions. Absent instructions that modify the path of execution of a program, such as branch instructions, instructions are generally executed sequentially. Traditional microprocessors include a program counter that points to the instruction that is to be executed. Generally, the instruction pointer is incremented by a set amount, such as by one, after completion of execution of an instruction to point to the next instruction in a program sequence.

If a microprocessor, however, executes multiple threads concurrently, synchronization issues between threads may arise. In a situation in which both threads are sharing system resources, a change implemented by a first thread may detrimentally effect instruction processing in a second thread. For example, if a first running thread were to switch memory translation context, the second running thread must be made aware of such a change to prevent processing errors. In a multithreaded environment such as this, especially in view of increased instruction processing speeds, the synchronization between threads becomes difficult.

SUMMARY OF THE INVENTION

The present invention addresses the above-described limitations associated with instruction synchronization in a multi-threaded microprocessor. The present invention provides an approach for synchronization of a microprocessor utilizing a trap element which stops instruction execution within a thread in a predictable manner.

In one embodiment of the present invention, a method is practiced in a microprocessor wherein an instruction within a first thread that requires a known processor state in relation to concurrently running additional threads is identified. Events requiring a known processor state prior to execution, herein referred to as syncronizing instructions, include, but are not limited to, instructions that read a system array directly, instructions that cause a change in branch prediction schemes, instructions that switch memory translation context, or instructions that start or stop instruction execution in a thread. Upon identifying a syncronizing instruction in a first thread, the next available instruction slated for execution in the second thread is identified. Following such an identification of this next executing instruction in a second thread, a trap is inserted into this next available instruction. Such a trap may be used as a sequential marker in microprocessor synchronization. Upon insertion of this trap, instruction processing in the second threat is halted. Furthermore, all instructions located before this trapped instruction in the second thread must subsequently retire before the synchronizing instruction in the first thread is executed. After all instructions in the second thread slated for execution prior to the trapped instruction have retired, the synchronizing instruction within the first running thread may then execute. Upon the completion of the synchronizing instruction execution in the first thread, all instructions slated for execution after the trapped instruction in the second thread are flushed from the processing queue and are subsequently refetched and executed. In light of this method, global processor state changes in an multithreaded out of order microprocessor may be implemented wherein one can be certain such changes have been implemented.

In accordance with another aspect of the present invention, a method for synchronizing a plurality of threads in an out of order microprocessor utilizing a detection facility and a trap facility is provided. The method comprises the utilization of a detection facility for detecting those events in a microprocessor requiring a known microprocessor state prior to the execution of a corresponding instruction. Examples of such events, although not inclusive of all potential events requiring synchronization, are set forth above. Upon detection of a synchronizing instruction in a first thread, a trap facility inserts a trap into the next available instruction slated for execution in each remaining executing thread. All instructions prior to the trapped instruction in these remaining executing threads must retire before the execution of the synchronizing instruction in the first thread. Following the retiring of all instructions prior to the trapped instruction, the synchronizing instruction of a first thread is systematically executed. To effectuate a global processor state change across all remaining running threads, all instructions located after the trapped instruction in each reamining thread are are flushed from the corresponding execution queue and are refetched. Such a flushing and refetching results in the processing of instructions in the remaiing threads with the appropriate updated global processor state.

In another aspect of the present invention, a method for inserting a trap into a running thread is taught. As set forth above, such a trap may be utilized in microprocessor synchronization in a microprocessor running multiple threads simultaneously. The use of this trap, however, is not limited exclusively to microprocessor synchronization, and may be used in numerous additional microprocessor instruction processing environments. Examples of such additional used include, but are not limited to, monitoring individual instruction as they pass through the instruction pipeline to evaluate microprocessor performance, as well as for use in debugging operations wherein a target instruction may be monitored via an attached trap. In inserting this trap, a last executed instruction in a running thread is determined. Following the determination of the last executed instruction, the next available instruction slated for execution is marked with a trap prior to its subsequent execution. This instruction is marked utilizing a data bit attached to the instruction, such that said data bit identifies the instruction as being marked with a trap. It should be noted that this trap may not have an associated trap handler, as is typical with software traps, but rather may simply trigger a state machine capable of signaling the microprocessor upon execution of the trapped instruction.

BRIEF DESCRIPTION OF THE DRAWINGS

An illustrative embodiment of the present invention will be described below relative to the following drawings.

DETAILED DESCRIPTION

The illustrative embodiment of the present invention provides an apparatus and method for use in synchronizing multiple threads in an out of order microprocessor. An out of order microprocessor is one in which instruction processing may occur regardless of the associated instruction line number (i.e., instructions may be processed "in order" or "out of order") In a microprocessor such as this, in which multiple threads may be concurrently running, it can be necessary to ensure that changes made to system parameters by one thread are reflected in all concurrently running threads. Implementing these changes globally prevents instruction processing errors in each of the running threads.

Figure 1:
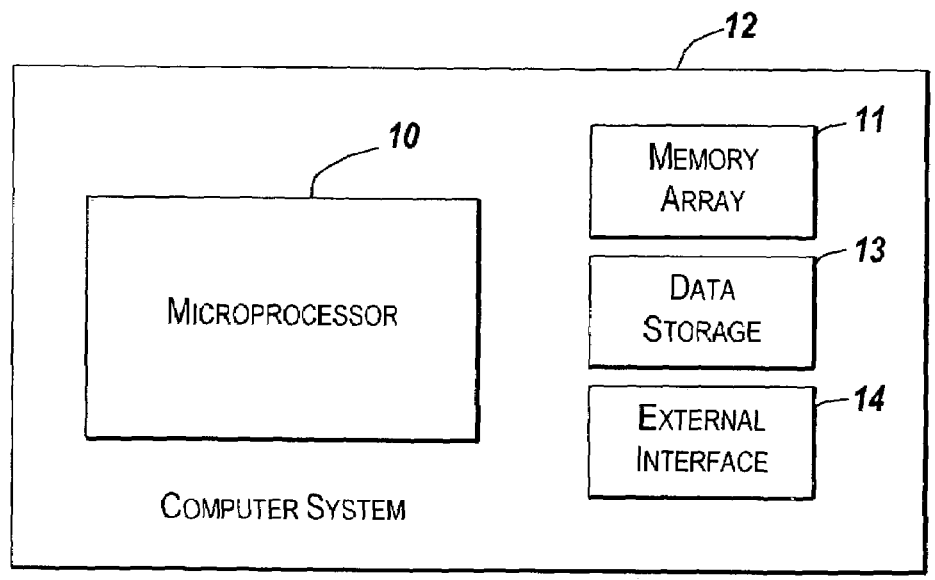
FIG. 1 depicts a microprocessor within a computer system.

FIG. 1 depicts a microprocessor 10 within a typical computer system 12. This microprocessor may process instructions in a conventional manner, or alternatively may process instructions in an out-of order manner. Additionally, this microprocessor may run either a single thread, or a plurality of threads simultaneously. The computer system 12 may additionally comprise elements such as a memory array 11, data storage element 13, and a graphics display element 14. These aforementioned elements, 11, 13 and 14, are merely representative of elements which may be found within the computer system 12, and are not exclusive to the practice of the claimed invention. In a multithreaded environment, in which a first running thread may access system resources shared by a second running thread, synchronization between these threads is essential.

Figure 2:
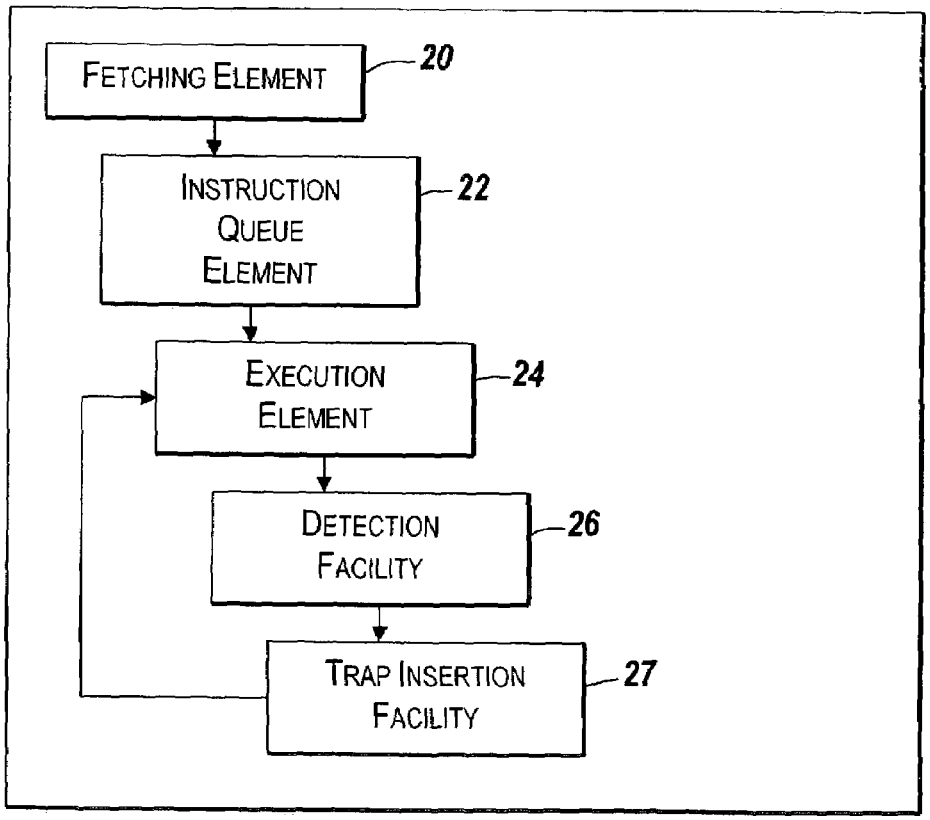
FIG. 2 depicts a high level block diagram of a microprocessor for use in the present invention.

FIG. 2 is a high level block diagram of the components of a microprocessor for use in the present invention. This microprocessor includes an instruction fetching element 20 capable of retrieving instructions from an instruction pipeline. Additionally, an instruction queue element 22 is contained within the microprocessor of the pending application. Such a queue may store several instructions slated for execution in advance of their execution, thereby reducing system resource requirements and increasing processing speed. Furthermore, an instruction execution element 24 is additionally taught within the pending application, wherein this execution element is capable of executing either a single thread or a plurality of threads simultaneously. The microprocessor 10 of the pending invention may additionally contain a detection facility 26, wherein this detection facility may scan processing instructions to determine those requiring synchronization. Finally, the microprocessor 10 of the present invention, when running two or more threads simultaneously, may include a trap insertion facility 27 capable of inserting a trap into one of these running threads of the microprocessor 10. This trap is comprised of a data bit attached to the executing instruction, which serves to indicate that the trapped instruction is one of a type which requires the syncronization of each running thread on the microprocessor. This trap is used as a sequential marker in the present invention, such that instructions within an instruction pipeline may be defined as executing either before or after the location of the trapped instruction. Additionally, this trap element may be utilized in microprocessor performance evaluation and microprocessor debugging operations by monitoring the trapped instruction throughout the instruction execution pipeline.

Figure 3:
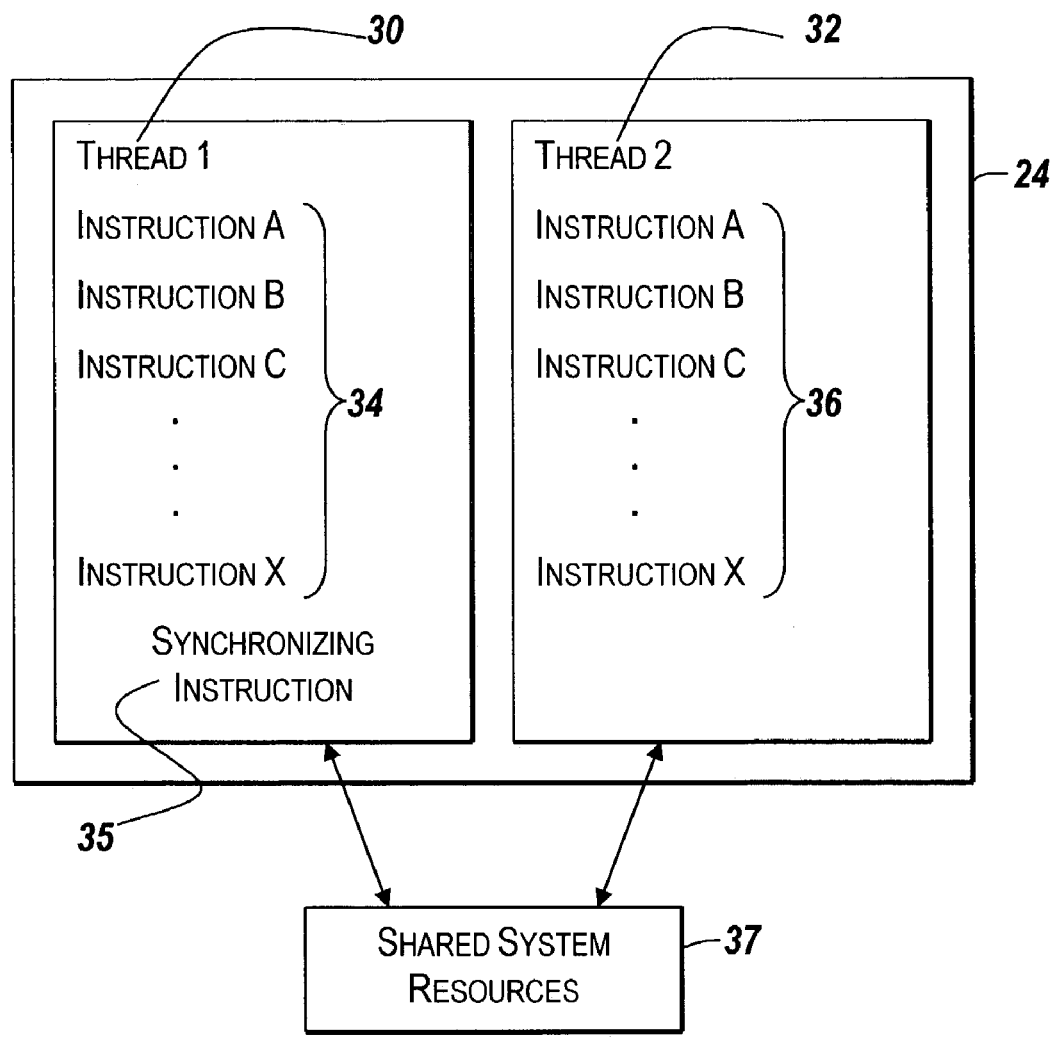
FIG. 3 is a single embodiment of the environment in which the present invention may be practiced.

FIG. 3 depicts an example of instructions in two threads 30 and 32 that are running concurrently within an execution element 24 of an out of order microprocessor. These threads 30 and 32 share system resources 37. A plurality of individual instruction 34 and 36 are contained in threads 30 and 32, respectively. These instructions 34 and 36 may execute in an out of order fashion. Prior to initiating changes to system parameters in one thread, a known global processor state must be initiated such that changes made to system parameters in one thread are uniformly applied across all remaining running threads. Absent such synchronization, processor errors may surface, thereby resulting in unpredictable results or a microprocessor crash. An instruction requiring a know global microprocessor state prior to its' execution, namely a synchronizing instruction 35, may be identified from a known group of instructions.

Figure 4:
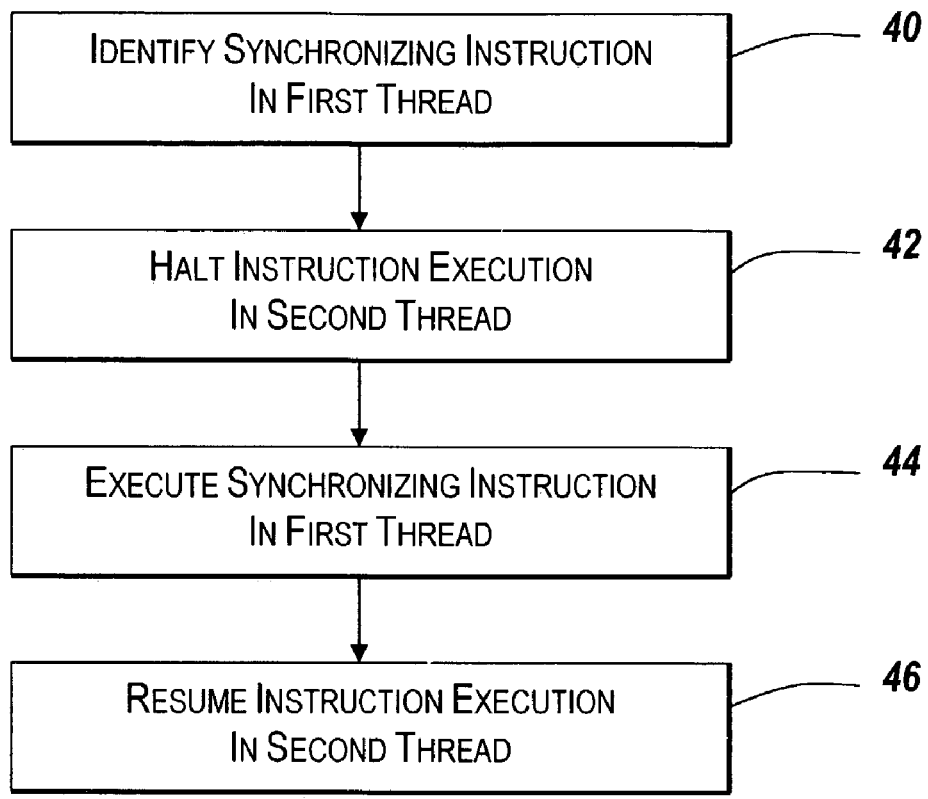
FIG. 4 is an illustrative flow diagram evidencing the requisite steps in synchronizing multiple threads in an out of order microprocessor.

FIG. 4 is a flowchart of the sequence of steps performed by the illustrative embodiment of the present invention in providing synchronization between threads. In the present embodiment two threads are shown as executing on a microprocessor in the name of simplicity. It should be known, however, that the method of FIG. 4 is easily adapted for situation in which more than two threads are concurrently executing. The sequence begins when the multithreaded out of order microprocessor 10 detects a synchronizing instruction 35 at step 40. A synchronizing instruction is one of a known group of instructions requiring global microprocessor changes. Examples of these synchronizing instructions include, but are not limited, to reading a system array directly, switching memory translation context, or employing a branch prediction scheme. Upon identification of this synchronizing instruction 35 in a first thread 30, instruction processing in the second thread 32 is halted in accordance with step 42. Following the systematic halting of instruction processing in the second thread 32, the identified synchronizing instruction of step 40 is executed in the first thread 30 as in set forth at step 44. Upon execution of this synchronizing instruction, instruction execution is resumed in the previously halted second thread in accordance with step 46.

Figure 5:
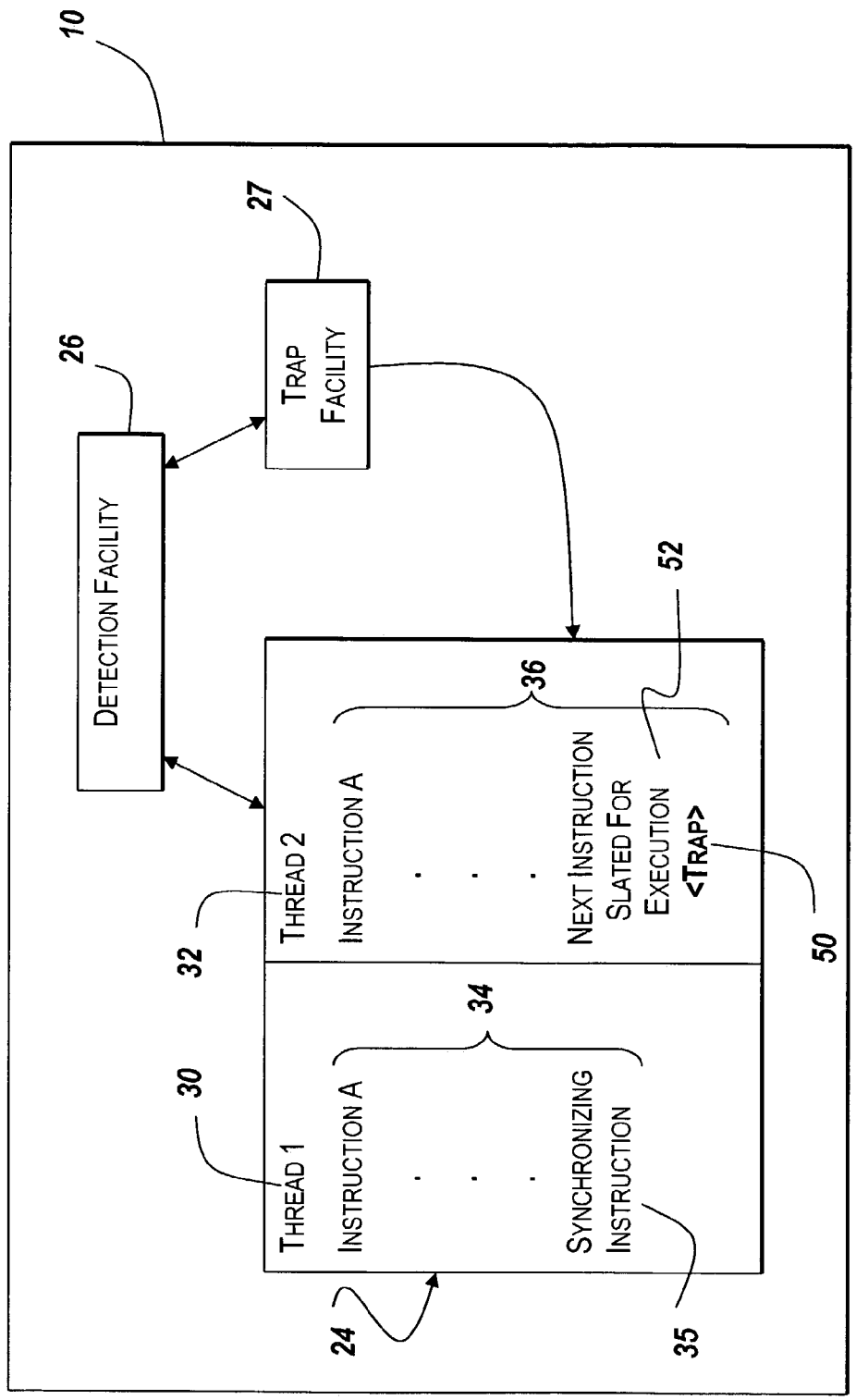
FIG. 5 illustrates a single embodiment of the current invention wherein a detection facility and a trap facility are employed.

FIG. 5 illustrates the detection facility 26 in a microprocessor 10 running multiple threads, which scans executing instructions within a first thread 30 of the execution element 24 in order to find an instruction 35 requiring microprocessor synchronization. In the present embodiment two threads are shown concurrently running on a microprocessor, although the present invention is easily adapted for instances in which more than 2 threads are concurrently running. In the two threaded embodiment of FIG. 5, executing instructions 34 within a first thread 30 may be processed in an out of order fashion. Upon detecting a synchronizing instruction 35, the detection facility 26 signals a trap insertion facility 27 to attach a trap 50 onto an instruction within a second running thread 32 of the execution element 24. In the illustrated embodiment, this trap comprises an extra data bit attached to the instruction, wherein this extra data bit identifies the instruction as containing a trap. Nevertheless, those skilled in the art will appreciate that this extra data bit is not necessary for practicing the present invention.

The trap triggers a state machine which signals the microprocessor upon execution of the trapped instruction. This trap facility 27 scans instructions 36 within this second thread 32 and identifies the next instruction slated for execution 52 within this thread 36. This next instruction slated for execution 52 is then marked with a trap 50.

The trap insertion facility 27 then monitors instruction processing within this second thread 32, thereby guaranteeing all instructions slated for execution prior to the instruction marked with the trap are executed and subsequently retire from the instruction pipeline. Upon determining all instructions located prior to the trapped instruction have retired, the synchronizing instruction 35 within the first thread 30 may then execute. Following the execution of this synchronizing instruction, all instructions located after the trapped instruction in the second thread 32 are flushed and refetched. In light of this flushing and refetching, instruction processing in this second thread 32 will now proceed utilizing the new global system parameter contained within the synchronizing instruction 35 of the first thread.

Figure 6:
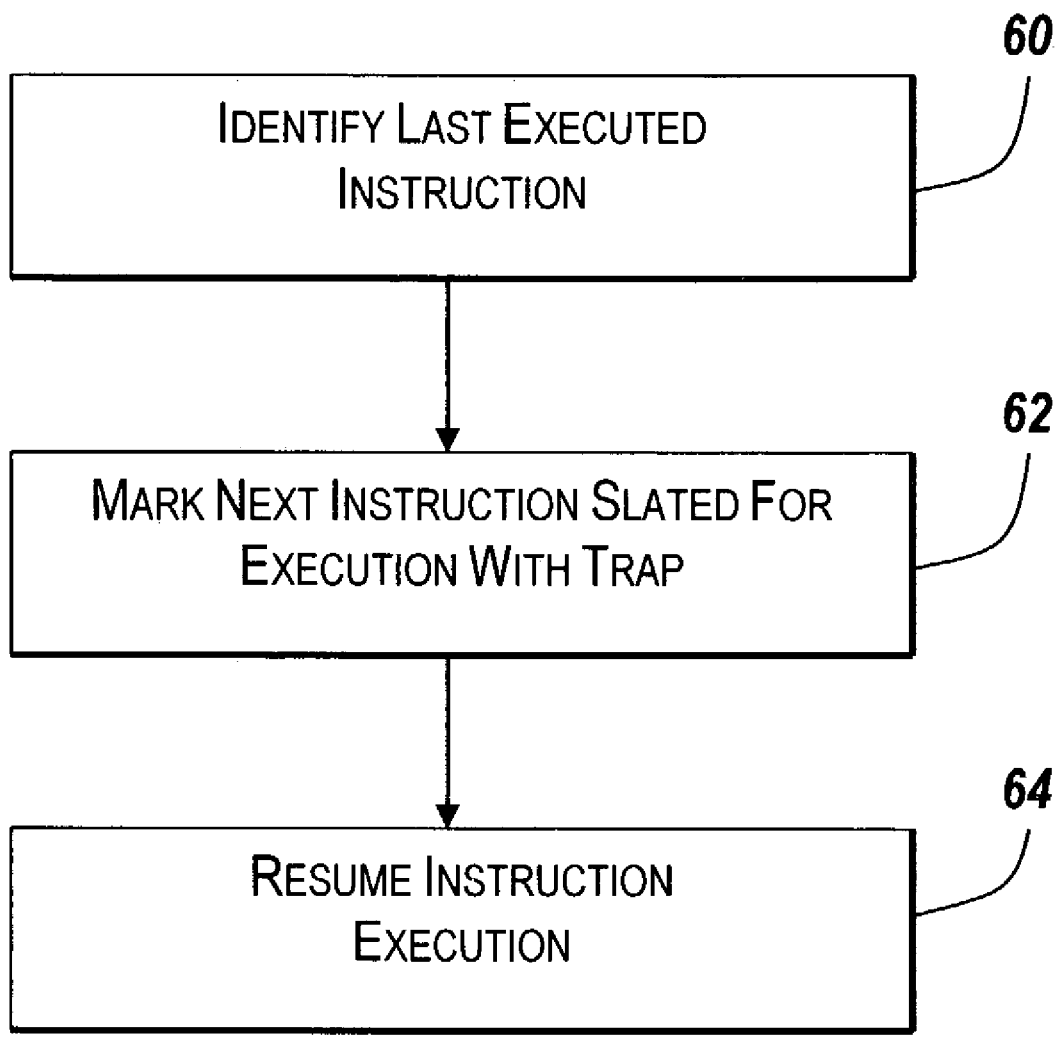
FIG. 6 is a flow diagram that illustrates steps taken to practice an illustrative embodiment of the present invention.

FIG. 6 is a flow diagram that illustrates steps taken to practice an illustrative embodiment of the present invention.

In a microprocessor running multiple threads simultaneously, in order to insert a trap into a running thread it is necessary to identify the last executed instruction in this running thread. Such identification is completed in block 60. Upon identifying this instruction, the next available instruction slated for execution is marked with a trap. Such a marking is seen in block 62 of FIG. 6. This trap is a trap identified by adding an extra data bit to said instruction. This data bit does not adversely effect subsequent instruction processing, but simply serves to identify the instruction as containing a trap. Additionally, this trapped instruction may trigger a state machine within the microprocessor wherein this state machine is capable of signaling the microprocessor upon the execution of the instructions marked with said trap. Furthermore, this trapped instruction may be used as a simple sequential marker, such that global microprocessor synchronization across several running threads may be accomplished. In utilizing this trap as a sequential marker, relative instruction processing position may be determined such that instructions which will be adversely effected by an instruction requiring microprocessor synchronization are processed in a manner such that their subsequent execution utilized the appropriate system parameter or parameters.

Following the marking of an instruction with a trap in a running thread, instruction execution is resumed in accordance with block 64 of FIG. 6.

While the present invention has been described with reference to an illustrative embodiment thereof, one skilled in the art will appreciate that various changes in form and detail may be made without parting from the intended scope of the present invention as defined in the pending claims. For example, although the illustrative embodiments of the figure only reference two concurrently running threads 30 and 32, microprocessor syncronization in accordance with the present invention may occur over three or more running threads on a single microprocessor.

What is claimed is:

1. A method for synchronizing multiple threads in an out of order microprocessor, comprising the steps of:
   identifying a synchronizing instruction in a sequence of instructions for a first thread executing on the microprocessor;
   in response to identifying the synchronizing instruction, halting execution of instructions in all other remaining threads that are executing on the microprocessor;
   executing the synchronizing instruction in said first thread;
   resuming execution of instructions in the remaining threads after executing the synchronizing instruction;
   marking a non-executed instruction that is slated for execution in each halted remaining thread with a trap;
   wherein instructions slated for execution prior to the instruction marked with a trap in each of the other remaining threads are retired before the synchronizing instruction is executed;
   wherein said synchronizing instruction is at least one that reads a system array directly, switches memory translation context, and employs a branch prediction scheme; and
   wherein the marking of a non-executed instruction with a trap in at least one of the other threads comprises adding an extra data bit to the non-executed instruction that identifies the trap as a hardware trap.

2. The method of claim 1 wherein said synchronizing instruction is one that employs a branch prediction scheme.

3. The method of claim 1 wherein said synchronizing instruction is one that switches memory translation context.

4. An out of order microprocessor for synchronizing threads, comprising:
   a detection facility for detecting events in the first thread requiring microprocessor synchronization; and
   a trap facility for inserting a trap in the second thread upon detection of an event in the first thread that requires microprocessor synchronization, wherein said trap is inserted in a next non-executed instruction slated for execution in the second thread, and wherein all instructions slated for execution prior to the instruction marked with a trap in the second thread retire before executing the synchronizing instruction in the first thread;
   marking a non-executed instruction that is slated for execution in each halted remaining thread with a trap;
   wherein the marking of a non-executed instruction with a trap in at least one of the other threads comprises adding an extra data bit to the non-executed instruction that identifies the trap as a hardware trap:
   wherein said trap is used as a sequential marker within the instruction pipeline of the second thread: and
   wherein said trap is used in at least one of monitoring individual instructions in an instruction pipeline, debugging an executing instruction set and evaluating performance of executing threads on a microprocessor.

5. The microprocessor of claim 4, wherein, after execution of the synchronizing instruction in a first thread, all instructions slated for execution after the trapped instruction in the second thread are flushed and refetched.

6. In a microprocessor running multiple threads simultaneously, a method for inserting a trap into a next instruction slated for execution in one of said running threads, comprising the steps of:
   identifying a last executed instruction in said one running thread on said microprocessor;
   marking the next instruction slated for execution within said one running thread with a trap prior to the execution of said next instruction by adding a data bit to the next non-executed instruction slated for execution within said running thread;
   wherein said trap triggers a state machine capable of signaling the microprocessor upon the execution of the instruction marked with said trap:
   wherein said trap is used as a sequential marker for synchronization of multiple threads in an out of order microprocessor:
   wherein said trap may be in at least one of monitoring individual instructions in an instruction pipeline and debugging an executing instruction set; and
   said trap is inserted into a running thread on a microprocessor capable of executing multiple threads concurrently following the identification of an instruction requiring microprocessor synchronization in a second thread running on said microprocessor.

7. The method of claim 6, wherein said trap may be utilized in evaluating the microprocessor efficiency in instruction execution.

* * * * *